United States Patent
Fletcher et al.

(10) Patent No.: US 6,238,165 B1
(45) Date of Patent: May 29, 2001

(54) TROUGH LIFTING MECHANISM

(75) Inventors: Jack Fletcher; Donald Boyd; Michael Hayden, all of Sidney, OH (US)

(73) Assignee: Shaffer Manufacturing Corp., Sidney, OH (US)

( * ) Notice: Subject to any disclaimer, the term of this patent is extended or adjusted under 35 U.S.C. 154(b) by 0 days.

(21) Appl. No.: 09/418,789

(22) Filed: Oct. 15, 1999

(51) Int. Cl.[7] .................................................. B65G 65/23
(52) U.S. Cl. .......................... 414/422; 414/420; 414/598; 254/3 R
(58) Field of Search ..................................... 414/409, 422, 414/595, 598, 600, 420, 423, 424; 254/3 R, 3 C, 4 R, 4 C, 7 R, 7 C

(56) References Cited

U.S. PATENT DOCUMENTS

| | | | |
|---|---|---|---|
| 1,617,820 | * | 2/1927 | Mortag .................................. 414/598 |
| 3,279,635 | * | 10/1966 | Avery et al. ........................... 414/420 |
| 3,784,033 | * | 1/1974 | Kaiseretal ........................ 414/598 X |
| 4,669,940 | * | 6/1987 | Englehardt et al. ............. 414/422 X |

FOREIGN PATENT DOCUMENTS

| | | | | |
|---|---|---|---|---|
| 190452 | * | 7/1956 | (AT) ..................................... 414/598 |
| 241226 | * | 8/1962 | (AU) ..................................... 414/422 |
| 1235813 | * | 3/1967 | (DE) ..................................... 414/420 |
| 2723340 | * | 12/1978 | (DE) ..................................... 414/422 |
| 2567863 | * | 1/1986 | (FR) ..................................... 414/420 |

OTHER PUBLICATIONS

Trough Mover, E.T.M.W. Enterprises Ltd., undated.

* cited by examiner

Primary Examiner—Frank E. Werner
(74) Attorney, Agent, or Firm—Harness, Dickey & Pierce, P.L.C.

(57) ABSTRACT

A lifting mechanism for moving a trough from a lowered position to an elevated having a pair of guide tracks operably coupled to a trough cradle by a pair of roller mechanisms. A lifting arm operably couples the trough cradle to a drive mechanism. As the trough cradle is elevated, the roller mechanisms move away from the drive mechanism and the trough cradle to rotate about a transverse axis.

15 Claims, 5 Drawing Sheets

TROUGH LIFTING MECHANISM

BACKGROUND AND SUMMARY OF THE INVENTION

This invention relates generally to machinery utilized in the preparation of dough for bread, pizza crust, and the like, and more particularly to a trough lifting mechanism for transferring a dough product between various apparatuses during the dough preparation process.

The preparation of various dough products requires transportation of large batches of sponge dough or final dough. For example, a sponge dough is created by measuring and mixing dry ingredients these ingredients with an appropriate amount of liquid ingredients in a commercial mixer. The mixer mixes the ingredients for a prescribed duration, resulting in a sponge dough having the desirable characteristics. This sponge dough is then transported to a second mixer where the remaining ingredients are combined therewith to form a final dough product. In some instances, proofing of the dough is also required where the final dough product is placed into another trough to sit for a prescribed period of time. After proofing, the dough mass is transported for subsequent forming into the desired shape by a dough transfer hopper, an extruder, a sheeting roller or by hand shaping.

Transfer of the dough product from one processing station to another often requires lifting of the trough above the bakery floor such that the dough mass may be dumped into the hopper of the processing apparatus. Trough lifting mechanisms having typically been utilized to support and elevate the trough. The prior art lifting mechanisms convey the trough vertically upward. Near the apex of its motion, the trough is rotated downwardly to dumped dough out of the trough. However, these lifting mechanisms provide no horizontal motion of the trough. As such a dough chute must be positioned below the trough to ensure that the dough is properly transferred to the processing apparatus.

Accordingly, it is a primary object of the present invention to overcome the disadvantages of the prior art and provide an improved trough lifting mechanism which efficiently transfers dough without requiring a dough chute or other device.

Another object of the present invention is to provide a trough lifting device which is capable horizontally positioning a trough above a processing apparatus such that the dough contained therein may be dumped directly into the apparatus.

A further object of the present invention is to provide a trough lifting mechanism which reduces the equipment necessary to transport dough from one processing station to another.

In accordance with these and other objects, the present invention is directed to a lifting mechanism for moving a trough from a first, lowered position to a second, raised position in which the trough cradle is also horizontally offset from the first, lowered position. The trough lifting mechanism includes a track assembly and a trough cradle operably coupled to the track assembly for positioning between the first and second positions. The track assembly includes a pair of guide tracks operably coupled to the trough cradle by a pair of roller mechanisms and a drive assembly having a drive track and a carriage supported by the drive track and positionable therealong. The trough cradle is operably coupled to the carriage by a lift arm. The drive mechanism moves the carriage along the drive track such that the lift arm manipulates the trough cradle along the pair of guide tracks. As the trough cradle moves generally vertically upwardly the trough remains substantially horizontal. Once the trough cradle, and hence the trough, has been sufficiently elevated, the trough cradle moves away from the drive track and rotates downwardly such that top of the trough is positioned over an adjacent apparatus so that the dough product may be dumped directly therein.

Additional objects and advantages will become apparent from a reading of the following detailed description of the preferred embodiment taken in conjunction with the accompanying drawings and appended claims.

DETAILED DESCRIPTION OF THE PREFERRED EMBODIMENT

The present invention is directed to a trough lifting mechanism to be utilized during the baking process of various bread products to facilitate the transfer of dough between various apparatuses. More specifically, the trough lifting mechanism is adapted to support and elevate a large wheel bin or trough commonly used to store and transfer dough between the various processing apparatuses.

Figure 1:
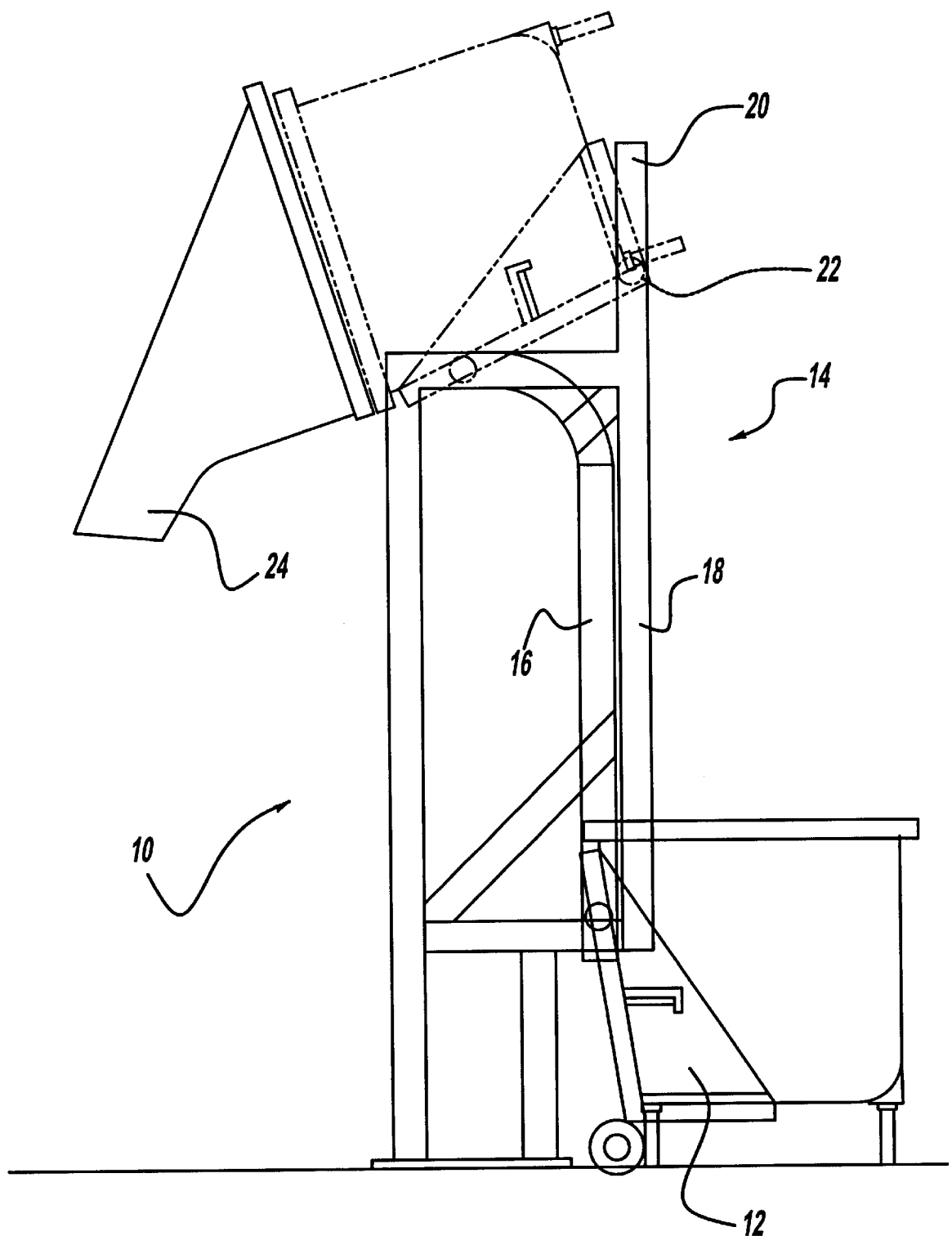
FIG. 1 is a side elevational view of a prior art trough lifting mechanism.

The lifting mechanism illustrated in FIG. 1 represents a prior art lifting mechanism 10 having a trough cradle 12 operably coupled to track assembly 14 having a guide track 16 and a drive track 18. The upper portion of trough cradle 12 is coupled to guide track 16 at pivot mechanism 20, and the lower portion of trough cradle 12 is coupled to drive track 18 at pivot mechanism 22. Drive mechanism 24 is supported in drive track 18 and is operable to position trough cradle 12 from a lowered position to a raised position. In the raised position, trough cradle 12 is pivoted downwardly about pivot mechanism 22 for dumping the dough out of the trough. The configuration of lifting mechanism 10 is such that trough cradle does not move horizontally during the lifting operation. Accordingly, chute 24 is positioned adjacent guide track 16 for directing the dough into an adjacent processing apparatus.

Figure 2:
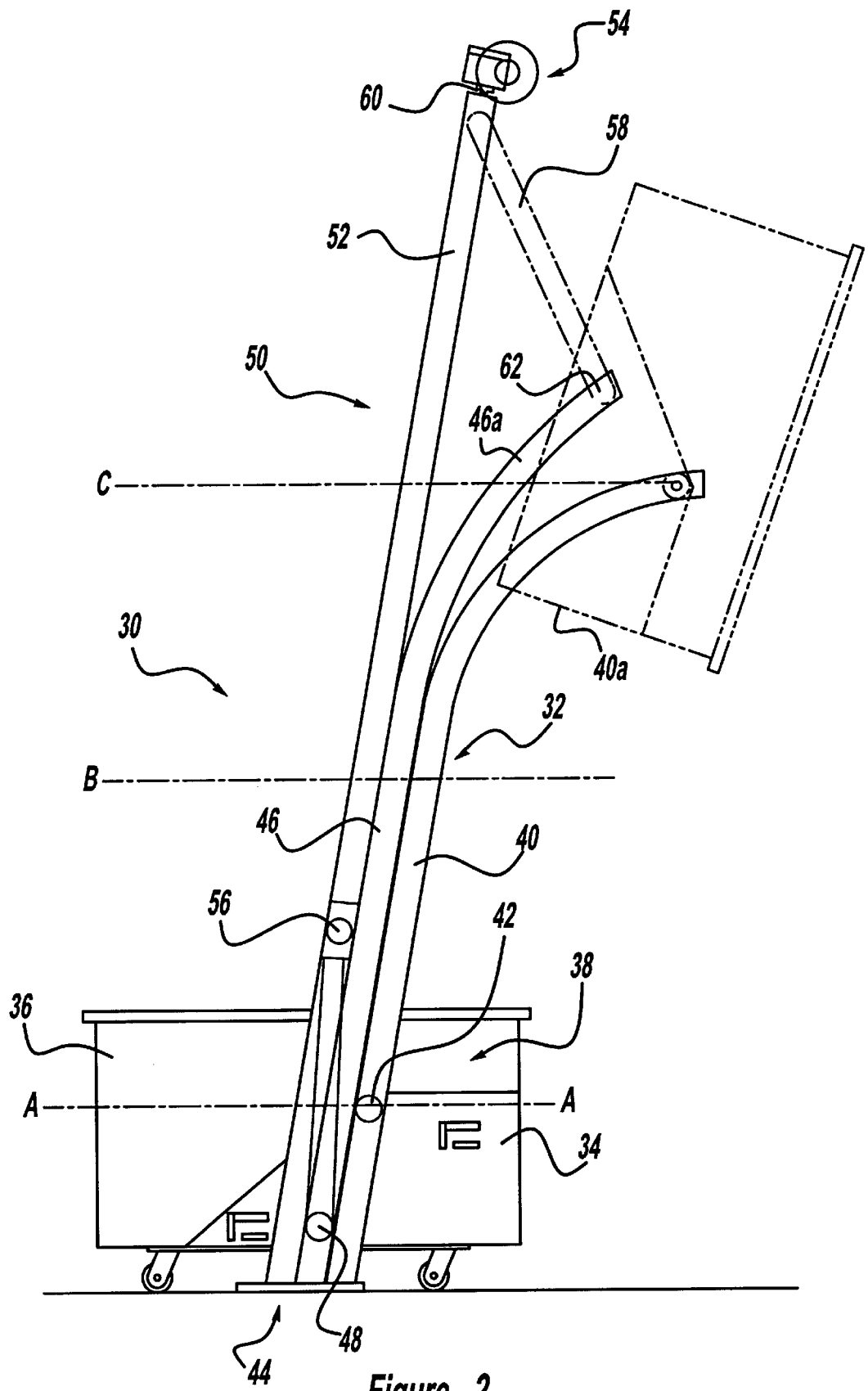
FIG. 2 is a side elevational view of a trough lifting mechanism in accordance with a preferred embodiment of the present invention.
Figure 3:
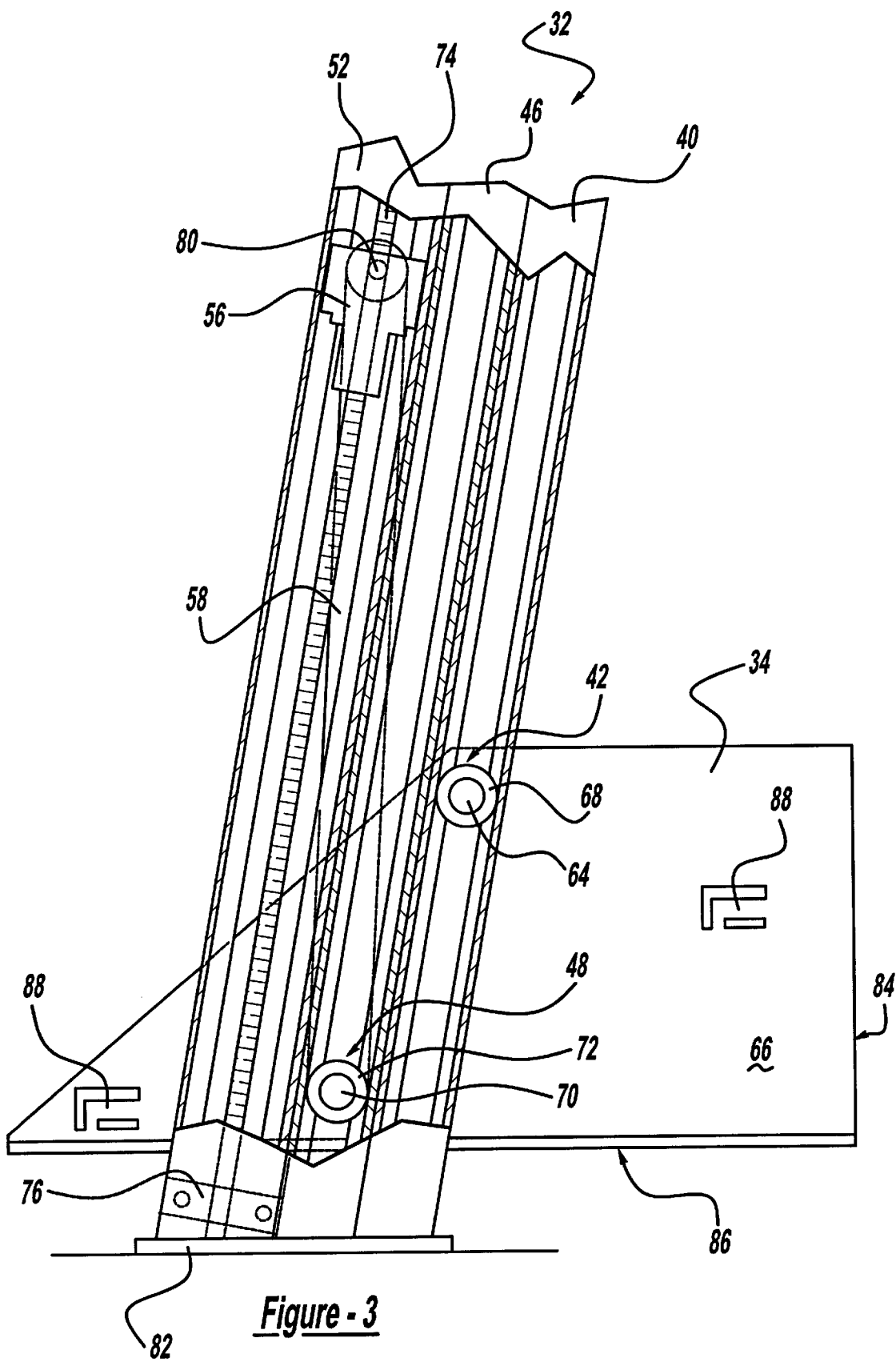
FIG. 3 is a detailed side view of the trough lifting mechanism.
Figure 4:
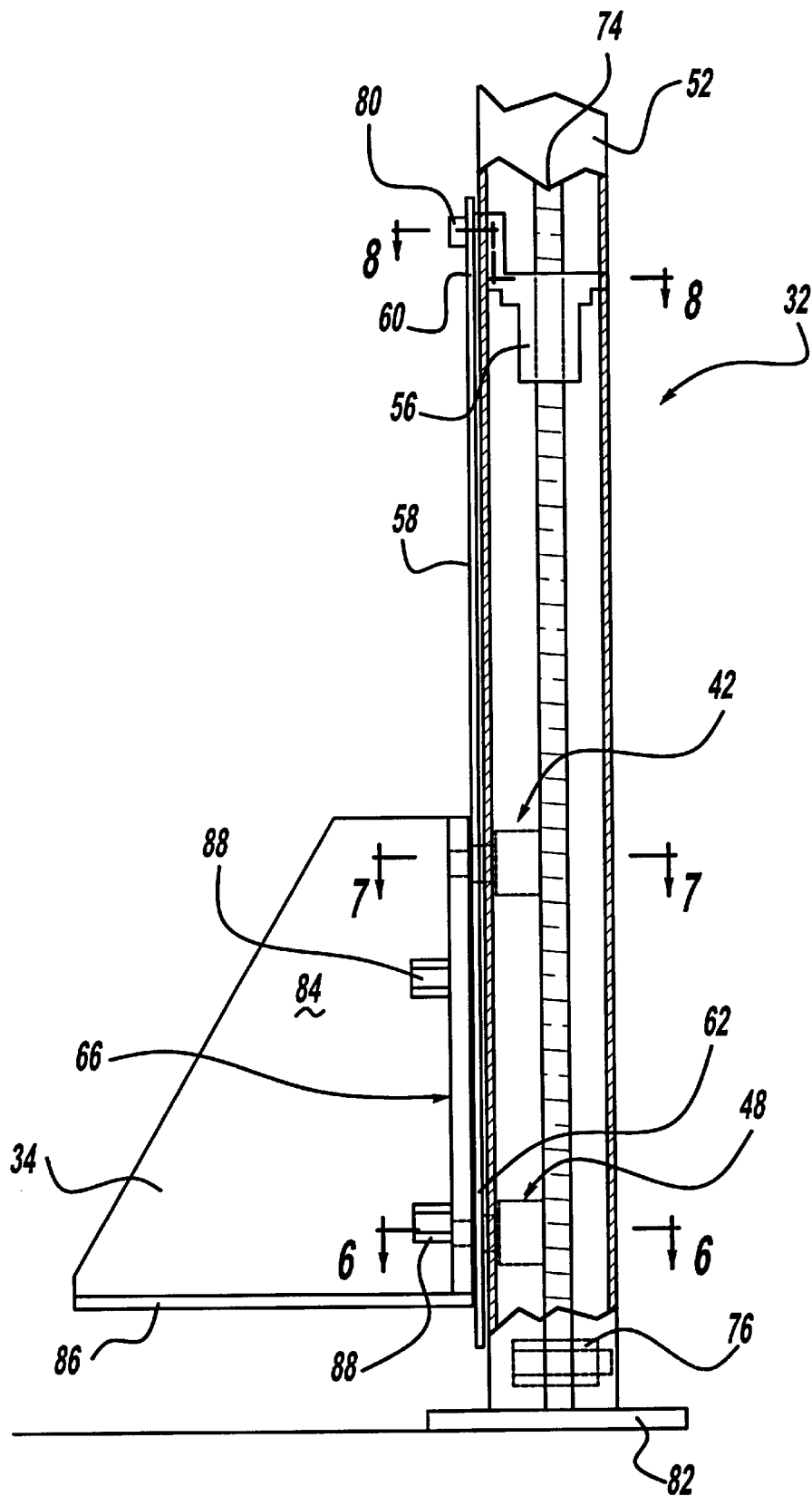
FIG. 4 is a detailed front view of the bottom portion of the trough lifting mechanism.
Figure 7:
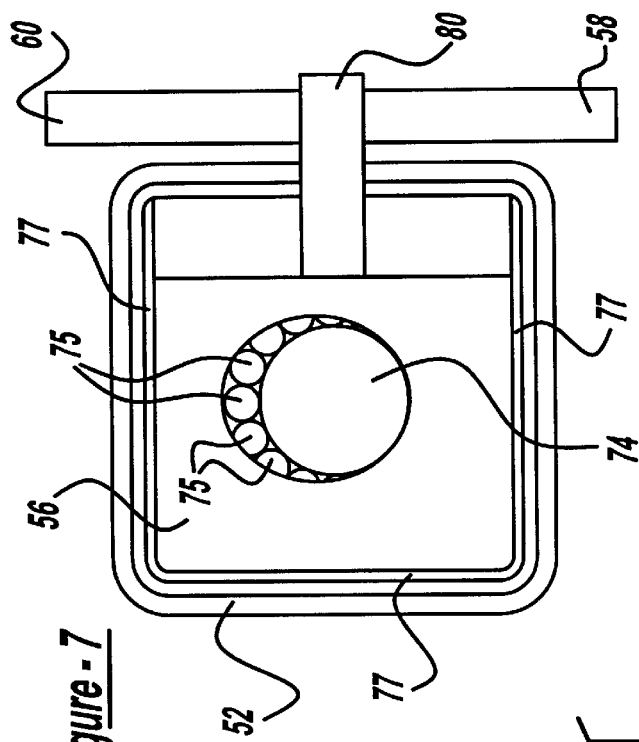
FIG. 7 is a cross-section through a drive subassembly taken at line VII—VII shown in FIG. 4.
Figure 6:
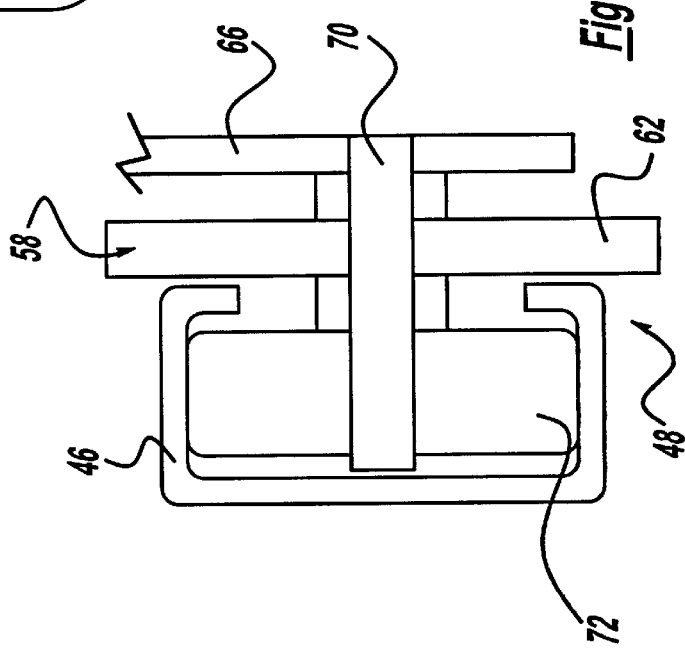
FIG. 6 is a cross-section through a guide track subassembly taken at line VI—VI shown in FIG. 4.
Figure 5:
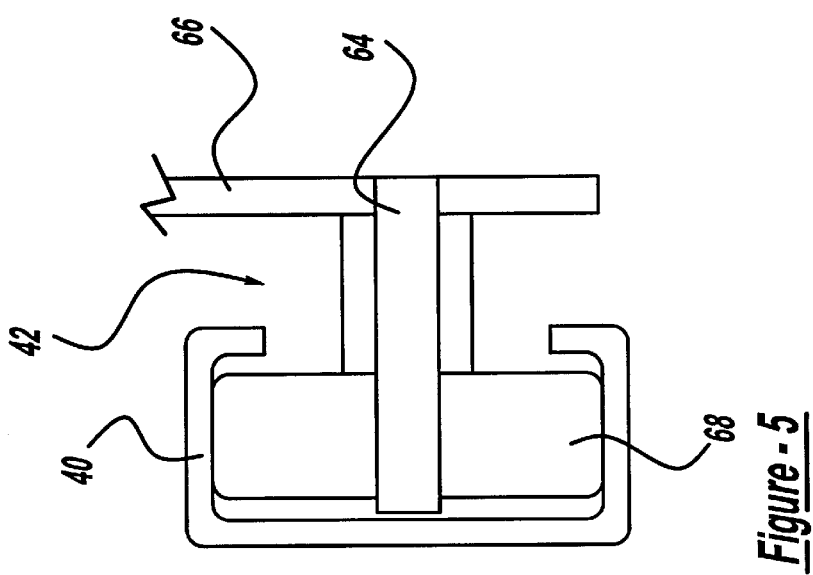
FIG. 5 is a cross-section through a guide track subassembly taken at line V—V shown in FIG. 4.

With reference now to FIGS. 2–4, the trough lifting mechanism of the present invention is illustrated. Trough lifting mechanism 30 includes a pair of track assemblies 32 operably coupled to a pair of trough cradle 34. Trough 36 may be placed between the track assemblies 32 on the trough cradles 34 and positioned from a lowered position to a raised position. One skilled in the art will readily recognize that the track assemblies 32 are substantially the same—one being a mirror image of the other. Accordingly, further description of the present invention will be made with reference to a single track assembly.

Track assembly 32 includes a guide track subassembly 38 having a guide track 40 operably coupled to trough cradle 34 at upper cradle roller mechanism 42 and a guide track subassembly 44 having guide track 46 pivotally coupled to trough cradle 34 at lower cradle roller mechanism 48. Track assembly 32 further includes drive track subassembly 50 having a drive track 52 operably supporting drive mechanism 54. Carriage 56 is coupled to drive mechanism 54 and axially positionable along drive track 52. Lift arm 58 is operably coupled between carriage 56 and roller mechanism 48 for manipulating trough cradle 34 between its lowered position and its raised position. As best illustrated in the phantom lines of FIG. 2, an upper end portion 60 of lift arm 58 is pivotally coupled to carriage 56, and a lower end portion 62 of lift arm 58 is pivotally coupled to roller mechanism 48.

One skilled in the art will readily recognize that the geometric configuration of guide tracks 40, 46 and drive track 52, as well as the kinematic relationship therebetween define the path of movement for trough cradle 34. As presently preferred, guide track 40 has an upper portion 40a curves approximately seventy-five degrees (75°). Similarly, guide track 46 has an upper portion 46a which curves approximately forty-five degrees (45°). Guide track 46 is interdisposed between guide track 40 and drive track 52 to divide the angle formed therebetween. Trough cradle 34, and hence trough 36, initially moves in a generally vertical direction for raising trough 36. During this vertical movement trough 36 remains substantially horizontal such that the load contained therein is not shifted. As shown in FIG. 2, the general range of vertical movement occurs from point A to point B along lift assembly 32. Once trough cradle 34 reaches point B, track assembly 32 moves trough cradle 34 in a horizontal direction away from drive assembly 50 and rotates trough cradle 34 approximately one hundred twenty degrees (120°) in the clockwise direction to point C.

With particular reference to FIGS. 3–7, cradle roller mechanisms 42 includes a shaft 64 which is secured to a vertical side wall 66 of trough cradle 34 and extends outwardly therefrom. A roller 68 is rotatably supported on shaft 64 and received within guide track 40 having a C-shaped cross-section for operably coupling guide track subassembly 38 to trough cradle 34. Similarly, cradle roller mechanism 48 includes a shaft 70 secured to vertical side wall 60 and extends outwardly therefrom. A roller 72 is rotatably supported on shaft 70 and received within guide track 46 having a C-shaped cross-section for operably coupling guide track subassembly 44 to trough cradle 34.

Drive mechanism 54 includes an elongated threaded rod or helical drive screw 74 extending axially within drive track 52. Bearing assemblies 76 located at the upper and lower ends of drive track 52 support drive screw 74 for rotational movement within drive track 52. Motor assembly 78 is operably coupled to drive screw 74 and includes a gear box assembly (not shown) having a 4:1 gear reduction ratio and a gear brake for providing adequate control of drive mechanism 54. Carriage 56 is rotatably supported on drive screw 74 such that rotation of drive screw 74 causes carriage 56 to move axially therealong. A plurality of stainless steel ball bearings 75 are operably disposed between carriage 56 and drive screw 74 to facilitate axial movement thereof. In a normal operating condition, carriage 56 is freely supported within drive track 52 by drive screw 74. However, in extreme loading conditions, deflection of the drive screw 74 may cause carriage 56 to rub on drive track 52. Accordingly, shims 77 made of a suitable reduced friction material such as a standard food grade plastic are interdisposed between carriage 56 and drive track 52 to prevent adverse wear to these components. A pivot shaft 80 extends laterally inwardly from carriage 56. Upper end portion 60 of lift arm 58 is pivotally coupled to pivot shaft 80. Lower end portion 62 of lift arm 58 is pivotally coupled to roller shaft 70 of lower cradle roller mechanism 48.

Guide track 40, guide track 46 and drive track 52 are cantilevered upwardly from base assembly 82 which may be secured to the bakery floor. As presently preferred, guide tracks 40, 46 and drive track 52 are secured together in an adjacent relationship, thereby enhancing the rigidity and structural integrity of track assembly 32. Track assembly 32 is oriented approximately ten degrees (10°) off vertical such that moderate horizontal displacement of tough cradle 34 is achieved with vertical movement thereof. The upper ends of guide tracks 40, 46 and drive track 52 are supported from the ceiling above in a conventional manner using angle iron or all-thread rods. In this manner, the amount of floor space required by trough lifting mechanism 30 is minimized.

Trough cradle 34 includes vertical side wall 66, vertical front wall 84 and horizontal floor portion 86 which are arranged in a manner to receive and support trough 36 therein. A plurality of self-locking mechanisms 88 are provided on vertical side wall 66 such that trough 36 is securely retained within trough cradle 34 during the lifting operation performed by trough lifting mechanism 30.

In operation, trough 36 is wheeled into position on trough cradle 34 such that locking mechanisms 88 engage to releasably secure trough 36 therein. Drive mechanism 54 is activated such that drive screw 74 rotates for moving carriage 56 axially upwardly in drive track 52. Lift arm 58 manipulates trough cradle upwardly through the path defined by guide tracks 40, 46. As trough cradle 34 reaches the upper portions 40a, 46a of guide tracks 40, 46, trough cradle 34 is manipulated horizontally away from drive track 52 and rotated in a clockwise direction approximately one hundred twenty degrees (120°) such that the opening of trough 36 is positioned directly above an adjacent apparatus so that dough may be dumped directly therein.

While the present invention has been described with particular reference to a preferred embodiment of a trough lifting mechanism which is well calculated to provide the above-stated objects and advantages, one skilled in the art will readily recognize that the present invention may be adapted to other embodiments. Furthermore, those skilled in the art will readily recognize from the foregoing discussion and accompanying drawings and claims that changes, modifications and variations can be made in the present invention without departing from the spirit and scope thereof as defined in the following claims.

We claim:

1. A trough lifting mechanism comprising:

a trough cradle having a wall and movable between a lowered position and an elevated position which is forward of said lowered position;

a first guide assembly including a first track having a first rail and a first roller mechanism extending from said wall and engaging said first rail for operably coupling said first track to said trough cradle;

a second guide assembly including a second track having a second rail, and a second roller mechanism extending from said wall and engaging said second rail for operably coupling said second track to said trough cradle;

a drive mechanism positionable between a first position and a second position; and a lifting arm having a first end pivotally coupled to said drive mechanism and a second end pivotally coupled to said trough cradle such that positioning of said drive mechanism from said first position to said second position elevates said lifting arm causing said trough cradle to follow said first and second tracks from said lowered position to said elevated position and to rotate about a transverse axis.

2. The trough lifting mechanism of claim 1 wherein said drive mechanism further comprises a driving member, a driven member operably coupled to said driving member, said driven member being positionable between said first and second positions.

3. The trough lifting mechanism of claim 2 wherein said driving member is a helical drive screw and said driven member is rotatably supported on said drive screw such that rotation of said drive screw causes said driven member to move axially therealong.

4. The trough lifting mechanism of claim 3 wherein said drive mechanism further comprises a motor operably coupled to said drive screw to provide rotation thereof.

5. The trough lifting mechanism of claim 2 wherein said driven member has a pivot shaft extending therefrom and said first end of said lift arm is pivotally coupled to said pivot shaft.

6. The trough lifting mechanism of claim 1 wherein each of said first and second roller mechanisms further comprise an axle shaft extending from said trough cradle and a roller rotatably supported on said axle shaft and received within said guide track for operably coupling said trough cradle to said guide assembly.

7. The trough lifting mechanism of claim 1 wherein each of said first and second guide tracks includes a linear portion and a curvilinear portion.

8. The trough lifting mechanism of claim 7 wherein said first and second lower portions are secured together in an adjacent relationship.

9. The trough lifting mechanism of claim 1 wherein said trough cradle wall further comprises a vertical side wall, a vertical front wall and a horizontal floor portion adapted to receive and support a trough.

10. The trough lifting mechanism of claim 1 wherein said trough cradle further comprises a locking mechanism adapted to releasably secure a trough therein.

11. The trough lifting mechanism of claim 1 wherein said rail includes a generally C-shaped cross section forming a channel.

12. The trough lifting mechanism of claim 11, wherein said channel receives said first and second roller mechanisms.

13. The trough lifting mechanism of claim 1 wherein said rail includes an elongated center member.

14. The trough lifting mechanism of claim 13 wherein said roper mechanisms surround a portion of said center member.

15. A trough lifting mechanism comprising:

a trough cradle having a wall and movable between a lowered position and an elevated position;

a drive assembly having a drive track, a motor, a drive screw operably coupled to said motor, and a carriage operably coupled to said drive screw such that rotation of said motor axially positions said carriage along said drive screw between a first position and a second position;

a first guide track including a first rail having a linear lower portion and a curvilinear upper portion;

a first roller mechanism having a first axle shaft extending from said wall of said trough cradle and a first roller rotatably supported on said first axle shaft and received within said first guide track so as to engage said first rail for operably coupling said trough cradle to said first guide track;

a second guide track including a second rail having a linear lower portion and a curvilinear upper portion, said second guide track being interdisposed between said first guide track and said drive track;

a second roller mechanism having a second axle shaft extending from said wall of said trough cradle and a second roller rotatably supported on said second axle shaft and received within said second guide track so as to engage said second rail for operably coupling said trough cradle to said second guide track; and a lifting arm having a first end pivotally coupled to said carriage and a second end pivotally coupled to said second axle shaft such that said lifting arm elevates said trough cradle along said first and second guide tracks causing said trough cradle to move away from said drive mechanism and to rotate about a transverse axis.

\* \* \* \* \*

UNITED STATES PATENT AND TRADEMARK OFFICE
CERTIFICATE OF CORRECTION

PATENT NO. : 6,238,165 B1
DATED : May 29, 2001
INVENTOR(S) : Jack Fletcher et al.

It is certified that error appears in the above-identified patent and that said Letters Patent is hereby corrected as shown below:

Column 1,
Line 13, delete "these ingredients".
Line 33, "dumped" should be -- dump --.
Line 45, after "capable" insert -- of --.

Column 2,
Line 5, after "that" insert -- the --.
Line 60, "cradle" should be -- cradles --.

Column 3,
Line 21, after "40a" insert -- which --.

Column 6,
Line 7, "roper" should be -- roller --.

Signed and Sealed this

Twenty-sixth Day of February, 2002

Attest:

*Attesting Officer*

JAMES E. ROGAN
*Director of the United States Patent and Trademark Office*